Patented Oct. 30, 1945

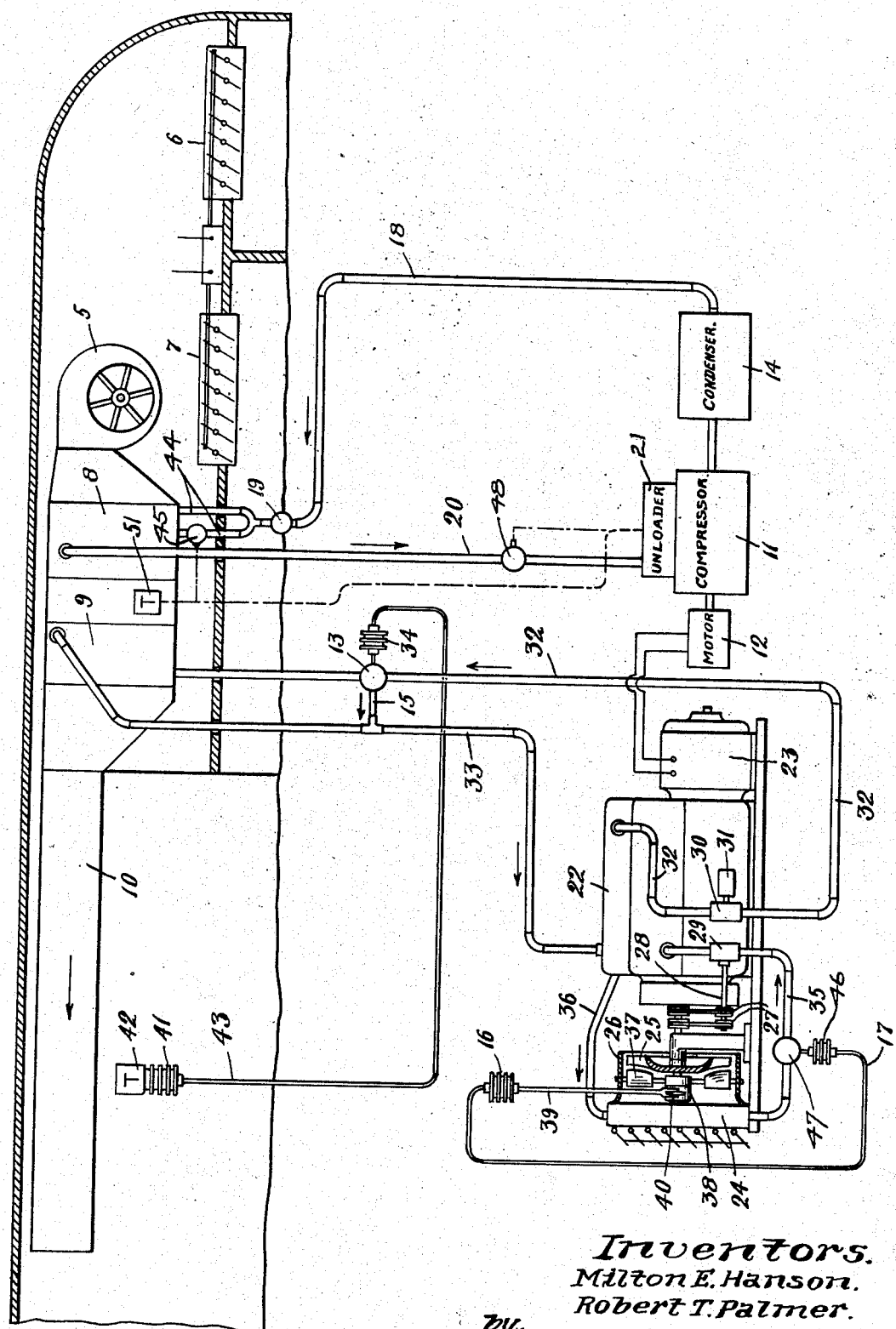

2,388,210

UNITED STATES PATENT OFFICE 2,388,210

REFRIGERATION SYSTEM FOR AIR-CONDITIONED PASSENGER VEHICLES

Milton E. Hanson, Haddonfield, N. J., and Robert T. Palmer, Sharon, Mass., assignors to B. F. Sturtevant Company, Hyde Park, Boston, Mass.

Application April 23, 1943, Serial No. 484,198

6 Claims. (Cl. 257—3)

This invention relates to refrigeration systems for air conditioned passenger vehicles and relates more particularly to systems utilizing internal combustion engines for supplying the power for refrigeration and for the air conditioning auxiliaries.

In the past, most air conditioned railway passenger cars have been energized by axle driven generators. These, especially in long trains, have resulted in too great consumption of energy from the locomotive. It is preferred to have each car equipped with its own internal combustion engine driving an electric generator which supplies energy to electric motors driving the refrigerant compressor and the auxiliaries as well as for lighting the car, and it is to this type of system to which this invention is applicable.

A feature of this invention resides in having a control variably load and unload the cylinders of a multiple cylinder refrigerant compressor supplying refrigerant to an air cooling evaporator for maintaining a substantially constant temperature in the air leaving the evaporator. The effective surface of the evaporator may be varied with this control.

Another feature of this invention resides in utilizing the heat in the jacket water of an internal combustion engine for reheating the air which has been chilled to a low temperature, and in controlling the temperature of the jacket water in the reheater in accordance with the reheat requirements while maintaining the temperature of the water in the engine, substantially constant.

An object of the invention is to maintain a desired low temperature in the air leaving an air cooling evaporator by variably loading and unloading the cylinders of a multiple cylinder refrigerant compressor supplying refrigerant to the evaporator.

Another object of the invention is to reheat air chilled by refrigeration apparatus driven by a liquid cooled internal combustion engine with the cooling liquid while maintaining the temperature of the cooling liquid at the engine, substantially constant.

Other objects of the invention are to reheat air chilled by refrigeration apparatus driven by an internal combustion engine with heat from the engine, and to reduce the power required for cooling the engine and for supplying the refrigeration.

The invention will now be described with reference to the drawing which is a diagrammatic view of a railway car air conditioning system embodying this invention.

The fan draws outdoor air through the grille 6 and recirculated air from the passenger space through the grille 7 and after passing it through the refrigerant evaporator 8 and reheater 9, discharges it through the distributing duct 10 into the passenger space.

The multiple cylinder compressor 11 driven by the electric motor 12 supplies refrigerant vapor into the air cooled condenser 14. The liquid refrigerant passes from the condenser 14 through the pipe 18, expansion valve 19 and branch pipes 44 into the two section evaporator 8 and is returned through the pipe 20 and unloader 21 to the suction side of the compressor.

The thermostat 51 which may be a dry bulb thermostat, is located at the down-stream side of the evaporator 8 and responds to changes in the temperature of the air leaving the evaporator. As will be described, it may accomplish this by loading or unloading the compressor 11; by connecting or disconnecting one of the sections of the evaporator and loading or unloading the compressor, or by connecting or disconnecting one of the sections of the evaporator and thereby causing a pressure responsive device to load or unload the compressor.

The internal combustion engine 22 which may be a Diesel engine, drives the electric generator 23 which supplies electric energy to the compressor motor 12 and to the various auxiliaries.

The engine 22 has the usual radiator 24 and has an axial flow fan 25 mounted in the casing 26 between the engine and the radiator and driven as is usual by the engine shaft which also drives through the belt drive 27 and the shaft 28, the engine water pump 29.

The pump 30 driven by the electric motor 31 is in the piping 32 supplying water from the cylinder jackets of the engine through the two-way valve 13 into the reheater 9 or through the bypass pipe 15 around the reheater depending upon the position of the valve 13. This water after leaving the reheater or the pipe 15, passes through the pipe 33 into the engine 22.

The engine jacket water is preferably maintained at a constant temperature which may be 160° F. This preferably is accomplished by the adjustment of the spin vanes 37 by the thermostat 47 as will be described.

The spin vanes 37 are mounted in the inlet to the fan 25 by being pivoted in the casing 26 and the bearing support 38 as shown in detail by the Bartlett and Leonard Patent No. 2,113,391 and are adjusted by the lever 39 which is connected to a lever 40 which corresponds to the lever 13 of said patent.

The lever 39 is connected to the bellows 16 which is connected by the tube 17 to the bellows 46 of the thermostat 47. This thermostat responds to the temperature of the cooling water entering the engine from the radiator 24 and adjusts the spin vanes as will be described, for causing spin in the air entering the fan 25 when less cooling of the water is required.

The dry bulb thermostat 42 is exposed to the temperature of the air in the passenger space and controls the two-way valve 13 for passing engine water through the reheater 9 or through the by-pass pipe 15 for maintaining a constant dry bulb temperature in the air in the passenger space. Its bellows 41 is connected by the tube 43 to the bellows 34 of the valve 13.

The thermostat 51 is at the air leaving side of the evaporator 8 and responds to changes in the temperature of the air leaving the evaporator. It may be connected to the unloader 21 for unloading the compressor 11 when the air leaving the evaporator has too low a temperature. Alternately it may be connected to the valve 45 and the unloader 21 and serve to increase or decrease the effective surface of the evaporator and to load or unload the compressor.

The unloader 21 may, for example, be of the type illustrated by the U. S. Patent No. 2,083,740, which issued June 15, 1937, on an application of E. M. Paullin, Jr.

Alternately the thermostat 51 may be used just to decrease the evaporator surface, and the pressurestat 48 in the suction line 20 may be used to unload the compressor. The result is substantially the same as when the thermostat unloads the compressor since the pressure change brought about by decreasing the evaporator surface causes the pressurestat to unload the compressor shortly after the evaporator surface is decreased. It is considered therefore, that in both cases, the unloading of the compressor is brought about by the thermostat 51. The pressurestat 48 may be included in the compressor assembly as described in the C. R. Neeson Patent No. 2,185,473.

The thermostat 51 may maintain the temperature of the air at the entrance to the reheater 9, at a dry bulb temperature of say 55° F. which experience has shown to be sufficiently low for adequate dehumidification. The air leaving the evaporator is not saturated. If the thermostat 51 is a dry bulb thermostat, it will not strictly speaking, be a dew point control, but it will for all practical purposes act as a dew point control through maintaining the evaporator at a sufficiently low temperature for ample dehumidification.

The reheater 9 raises the dry bulb temperature of the dehumidified air to say 75° F. The thermostat 42 exposed to the delivered air maintains it at 75° F. by adjusting the valve to pass more water into the reheater when more reheat is required, and by adjusting it to by-pass more water around the reheater when less reheat is required. Passing the jacket water through the reheater results in cooling the engine water and in less air being handled by the fan 25 and in less power being required by the fan, from the engine 22. Thus as the reheat load increases, the fan load decreases.

In most large air conditioning installations in buildings, reheat is added to the air dehumidified by refrigeration, by mixing recirculated air as by-pass air with the chilled air. There is no room for the recirculated and by-pass air ducts for accomplishing this in railway passenger cars so in the past, reheat has been provided in a few cars by steam coils or by heating reheat water electrically. But providing reheat by steam from the locomotive or by electric energy from an electric generator results in increased cost so that these methods have not been acceptable to the railroads.

The practice of this invention involves no additional cost for providing reheat over that required for providing refrigeration. The circulating water serves both to reheat the dehumidified air and to cool the engine. As the reheat load is increased, the fan load on the engine is reduced. The reheating thus substantially pays for itself.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. An air conditioning system comprising a variable surface air cooling evaporator, means including a multiple cylinder compressor for supplying refrigerant to said evaporator, means including a thermostat responsive to changes in the temperature of the air from said evaporator for varying the surface thereof and for variably loading and unloading said compressor, a reheater for the air from said evaporator, and means including a dry bulb thermostat responsive to changes in the dry bulb temperature of the air from said reheater for adjusting the temperature thereof, said thermostats cooperating to maintain a substantially constant relative humidity and a substantially constant dry bulb temperature in the delivered air.

2. An air conditioning system comprising a variable surface air cooling evaporator, an air reheater, means including a multiple cylinder compressor for supplying refrigerant to said evaporator, means including a liquid cooled internal combustion engine for energizing said compressor, means responsive to changes in the temperature of the air from said evaporator for varying the surface of said evaporator and for variably loading and unloading said compressor, means for circulating cooling liquid from said engine through said reheater or in a by-pass path around said reheater, and means including a thermostat responsive to changes in the dry bulb temperature of the air from said reheater for adjusting said last mentioned means for increasing the volume of liquid through said reheater upon a decrease in the dry bulb temperature of the air from said reheater.

3. An air conditioning system comprising a variable surface air cooling evaporator, means including a multiple cylinder compressor for supplying refrigerant to said evaporator, means including a liquid cooled internal combustion engine for energizing said compressor, means including means responsive to changes in the temperature of the air from said evaporator for varying the effective surface of said evaporator and for variably loading and unloading said compressor, a reheater for the air from said evaporator, means for circulating cooling liquid from said engine through said reheater, and means including a dry bulb thermostat responsive to changes in the temperature of the air from said reheater for varying the volume of said liquid through said reheater.

4. An air conditioning system comprising a variable surface air cooling evaporator, means including a multiple cylinder compressor for supplying refrigerant to said evaporator, means including a liquid cooled internal combustion engine for energizing said compressor, means for maintaining a substantially constant temperature in the cooling liquid of said engine, means including a thermostat responsive to changes in the temperature of the air from said evaporator for varying the effective surface of said evaporator and for variably loading and unloading said compressor, a reheater for the air from said evaporator, means for circulating said liquid through said reheater, and means including a dry bulb thermostat responsive to changes in the temperature of the air from said reheater for varying the volume of said liquid through said reheater.

5. An air conditioning system comprising a variable surface air cooling evaporator, means including a multiple cylinder compressor for supplying refrigerant to said evaporator, means including a liquid cooled internal combustion engine for energizing said compressor, means including means responsive to changes in the temperature of the air from said evaporator for varying the effective surface thereof, means including means responsive to changes in the pressure of the refrigerant returned from said evaporator for variably loading and unloading said compressor, a reheater for the air from said evaporator, means for circulating cooling liquid from said engine through said reheater, and means including a dry bulb thermostat responsive to changes in the temperature of the air from said reheater for varying the volume of said liquid through said reheater.

6. An air conditioning system comprising a variable surface air cooling evaporator, means including a multiple cylinder compressor for supplying refrigerant to said evaporator, means including a liquid cooled internal combustion engine for energizing said compressor, means for maintaining a substantially constant temperature in the cooling liquid of said engine, means including a thermostat responsive to changes in the dry bulb temperature of the air from said evaporator for varying the effective surface thereof, means including means responsive to changes in the pressure of the refrigerant returned from said evaporator for variably loading and unloading said compressor, a reheater for the air from said evaporator, means for circulating said liquid through said reheater, and means including a dry bulb thermostat responsive to changes in the temperature of the air from said reheater for varying the volume of said liquid through said reheater.

MILTON E. HANSON.
ROBERT T. PALMER.